(12) United States Patent
Suto et al.

(10) Patent No.: US 12,061,852 B2
(45) Date of Patent: Aug. 13, 2024

(54) GENERATING DIGITAL BUILDING REPRESENTATIONS AND MAPPING TO DIFFERENT ENVIRONMENTS

(71) Applicant: Kyndryl, Inc., New York, NY (US)

(72) Inventors: Tiberiu Suto, Franklin, NY (US); Nadiya Kochura, Bolton, MA (US); Schuyler Bruce Matthews, Cary, NC (US); Hemant Kumar Sivaswamy, Pune (IN); Prakalathan Nirmalakumaran, Colombo (LK)

(73) Assignee: Kyndryl, Inc., New York, NY (US)

( * ) Notice: Subject to any disclaimer, the term of this patent is extended or adjusted under 35 U.S.C. 154(b) by 822 days.

(21) Appl. No.: 17/247,168

(22) Filed: Dec. 2, 2020

(65) Prior Publication Data

US 2022/0171906 A1 Jun. 2, 2022

(51) Int. Cl.
*G06F 30/27* (2020.01)
*G06F 18/21* (2023.01)
*G06N 20/00* (2019.01)
*G06F 119/06* (2020.01)
*G06N 3/08* (2023.01)

(52) U.S. Cl.
CPC .......... *G06F 30/27* (2020.01); *G06F 18/2178* (2023.01); *G06N 20/00* (2019.01); *G06F 2119/06* (2020.01); *G06N 3/08* (2013.01)

(58) Field of Classification Search
CPC .. G06F 30/27; G06F 18/2178; G06F 2119/06; G06F 30/13; G06N 20/00; G06N 3/08
See application file for complete search history.

(56) References Cited

U.S. PATENT DOCUMENTS

| 9,671,768 B2 | 6/2017 | Lo |
| 9,958,872 B2 | 5/2018 | Anderson |
| 2010/0283606 A1 | 11/2010 | Tsypin |
| 2011/0193423 A1 | 8/2011 | Stalker |

(Continued)

FOREIGN PATENT DOCUMENTS

| CN | 102354190 A | 2/2012 |
| EP | 2780773 A1 | 6/2015 |
| WO | 2013074836 A1 | 5/2013 |

OTHER PUBLICATIONS

Anonymous, "What's the Big Deal About the HERS Index?", Hersindex.com, Apr. 28, 2019 [accessed on Dec. 2, 2020], 6 pages, Retrieved from the Internet: <URL: https://www.hersindex.com/articles/whats-the-big-deal-about-the-hers-index-2/>.

(Continued)

*Primary Examiner* — Pei Yong Weng
(74) *Attorney, Agent, or Firm* — CANTOR COLBURN LLP; Erik Swanson (57) ABSTRACT

A method, computer system, and a computer program product for environment mapping is provided. The present invention may include generating a digital twin, wherein the digital twin is a digital representation of a smart building. The present invention may include applying the digital twin to a second building. The present invention may include providing an implementation assessment, wherein the implementation assessment includes at least the environmental impact of preferences of a user in the second building.

19 Claims, 5 Drawing Sheets

(56) References Cited

U.S. PATENT DOCUMENTS

| | | | |
|---|---|---|---|
| 2015/0310450 A1* | 10/2015 | Fairbanks | G06Q 30/018 |
| | | | 705/317 |
| 2019/0163215 A1* | 5/2019 | Cheng | G05B 15/02 |
| 2020/0092127 A1 | 3/2020 | Park | |
| 2020/0125053 A1 | 4/2020 | Park | |
| 2020/0133213 A1 | 4/2020 | Park | |
| 2020/0210850 A1* | 7/2020 | Nuthi | G06N 3/084 |
| 2021/0055750 A1* | 2/2021 | Noziere | G06N 20/00 |

OTHER PUBLICATIONS

Broer, et al., "Enabling low carbon living in UK housing developments," 18 pages, University College London, UK, Retrieved from the Internet: <URL: https://www.sue-mot.org/conference-files/2009/restricted/papers/papers/Broer.pdf>.

Disclosed Anonymously, "Virtual Reality System That Uses Digital Twins to Visualize an Individual's Level of Adaptability," IP.com, Apr. 16, 2020, 3 pages, IP.com No. IPCOM000261908D, Retrieved from the Internet: <URL: https://priorart.ip.com/IPCOM/000261908>.

Gopinath, et al, "Re-design of smart homes with digital twins," International conference on computer vision and machine learning, 2019, 10 pages, IOP Publishing, doi:10.1088/1742-6596/1228/1/012031, Retrieved from the Internet: <URL: https://iopscience.iop.org/article/10.1088/1742-6596/1228/1/012031/pdf>.

Kelly, et al., "Towards the Implementation of IoT for Environmental Condition Monitoring in Homes," IEEE Sensors Journal, Oct. 2013 [accessed on Aug. 31, 2020], pp. 3846-3853, vol. 13, Issue 10, IEEE, 10.1109/JSEN.2013.2263379, Retrieved from the Internet: <URL: https://ieeexplore.ieee.org/document/6516934>.

Lee, et al., "The Internet of Things (IoT): Applications, investments, and challenges for enterprises," Business Horizons, 2015, pp. 431-440, vol. 58, Issue 4, Elsevier Inc., https://doi.org/10.1016/j.bushor.2015.03.008, Retrieved from the Internet: <URL: http://iranarze.ir/wp-content/uploads/2016/10/E2609.pdf>.

Mell, et al., "The NIST Definition of Cloud Computing", National Institute of Standards and Technology, Special Publication 800-145, Sep. 2011, 7 pages.

Resnet HERS Index, "What is the HERS Index," HERS Index, 2019 [accessed on Aug. 31, 2020], 3 pages, Retrieved from the Internet: <URL: https://www.hersindex.com/hers-index/what-is-the-hers-index/>.

Siemens, "Digitalization in industry: Twins with potential," Siemens Newletter, [accessed on Aug. 31, 2020], 10 pages, Retrieved from the Internet: <URL: https://new.siemens.com/global/en/company/stories/industry/the-digital-twin.html>.

The HERS Index, Interactive Index, 1 page, Retrieved from the Internet: <URL: https://www.hersindex.com/hers-index/interactive-hersindex/interactive-hersindex-inside/#60>.

Tiny ML Summit, "About the tinyMLTM Summit," Tiny ML, Feb. 12-13, 2020 [accessed on Aug. 31, 2020], 41 pages, Retrieved from the Internet: <URL: https://www.tinyml.org/summit/>.

Vellei, et al., "The effect of real-time context-aware feedback on occupants' heating behaviour and thermal adaptation," Energy and Buildings, Abstract, Jul. 1, 2016 [accessed on Aug. 31, 2020], 2 pages, DOI: 10.1016/j.enbuild.2016.03.045., Retrieved from the Internet: <URL: https://www.sciencedirect.com/science/article/abs/pii/S0378778816301992>.

Wired Brand Lab, "Creating a building's 'digital twin'," Business Operations, Nov. 1, 2017 [accessed on Aug. 31, 2020], 7 pages, Retrieved from the Internet: <URL: https://www.ibm.com/blogs/internet-of-things/creating-buildings-digital-twin/>.

Annual Greenhouse Gas Index, "Warming influence of greenhouse gases is increasing", https://www.globalchange.gov/browse/indicators/indicator-annual-greenhouse-gas-index, (Retrieved: Jul. 25, 2023), 3 pages.

IBM Blog, Artificial intelligence, "Transforming customer service: How generative AI is changing the game", 2023, 11 pages.

\* cited by examiner

GENERATING DIGITAL BUILDING REPRESENTATIONS AND MAPPING TO DIFFERENT ENVIRONMENTS

BACKGROUND

The present invention relates generally to the field of computing, and more particularly to energy efficiency systems.

Smart buildings may use information technology during operation to connect a variety of subsystems, which may operate independently, sharing information and providing comprehensive information on building performance. These systems may involve machine-to-machine communication; however, the data may be general in nature and the communication protocols may be proprietary, therefore information may only flow along certain paths. Smart buildings may require connectivity between all equipment and systems in a building. As a result, voluntary collaboration may have led to the adoption of open standards providing interoperable, connected devices and systems within a building. The result may be a building where lighting, air conditioning, security and other systems pass data freely back and forth, leading to higher efficiency, more safety and comfort, and lower cost operation of the facility.

Utilizing the comprehensive information on building performance of smart buildings may allow a user to assess the resource consumption and environmental impact of other buildings.

SUMMARY

Embodiments of the present invention disclose a method, computer system, and a computer program product for environment mapping. The present invention may include generating a digital twin, wherein the digital twin is a digital representation of a smart building. The present invention may include applying the digital twin to a second building. The present invention may include providing an implementation assessment, wherein the implementation assessment includes at least the environmental impact of preferences of a user in the second building.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for environment mapping. As such, the present embodiment has the capacity to improve the technical field of energy efficiency systems by generating a digital twin, wherein the digital twin is a digital representation of a smart building and applying the digital twin to a second building. More specifically, the present invention may include analyzing a smart building. The present invention may include training a machine learning model based on a comprehensive database. The present invention may include determining a green score for the smart building. The present invention may include generating a digital twin, wherein the digital twin is a digital representation of the smart building.

As described previously, smart buildings may use information technology during operation to connect a variety of subsystems, which may operate independently, sharing information and providing comprehensive information on building performance. These systems may involve machine-to-machine communication; however, the data may be general in nature and the communication protocols may be proprietary, therefore information may only flow along certain paths. Smart buildings may require connectivity between all equipment and systems in a building. As a result, voluntary collaboration may have led to the adoption of open standards providing interoperable, connected devices and systems within a building. The result may be a building where lighting, air conditioning, security and other systems pass data freely back and forth, leading to higher efficiency, more safety and comfort, and lower cost operation of the facility.

Utilizing the comprehensive information on building performance of smart buildings may allow a user to assess the resource consumption and environmental impact of other buildings.

Therefore, it may be advantageous to, among other things, analyze a smart building, train a machine learning model based on a comprehensive database, determine a green score for the smart building, and generate a digital twin.

According to at least one embodiment, the present invention may improve replicating preferences of a user in a second building by applying a digital twin to a second building, wherein the digital twin is a digital representation of the smart building.

According to at least one embodiment, the present invention may improve the effectiveness in which a user can monitor their environmental impact by determining a green score for the smart building.

According to at least one embodiment, the present invention may improve the effectiveness in which a user can monitor their environmental impact in a second building by applying the digital twin to a second building, providing an implementation assessment, and by providing one or more recommendations.

According to at least one embodiment, the present invention may improve the effectiveness of energy efficient systems by applying a digital twin to a second building by determining one or more corresponding IoT devices and determining corresponding building information between the smart building and the second building.

Figure 1:
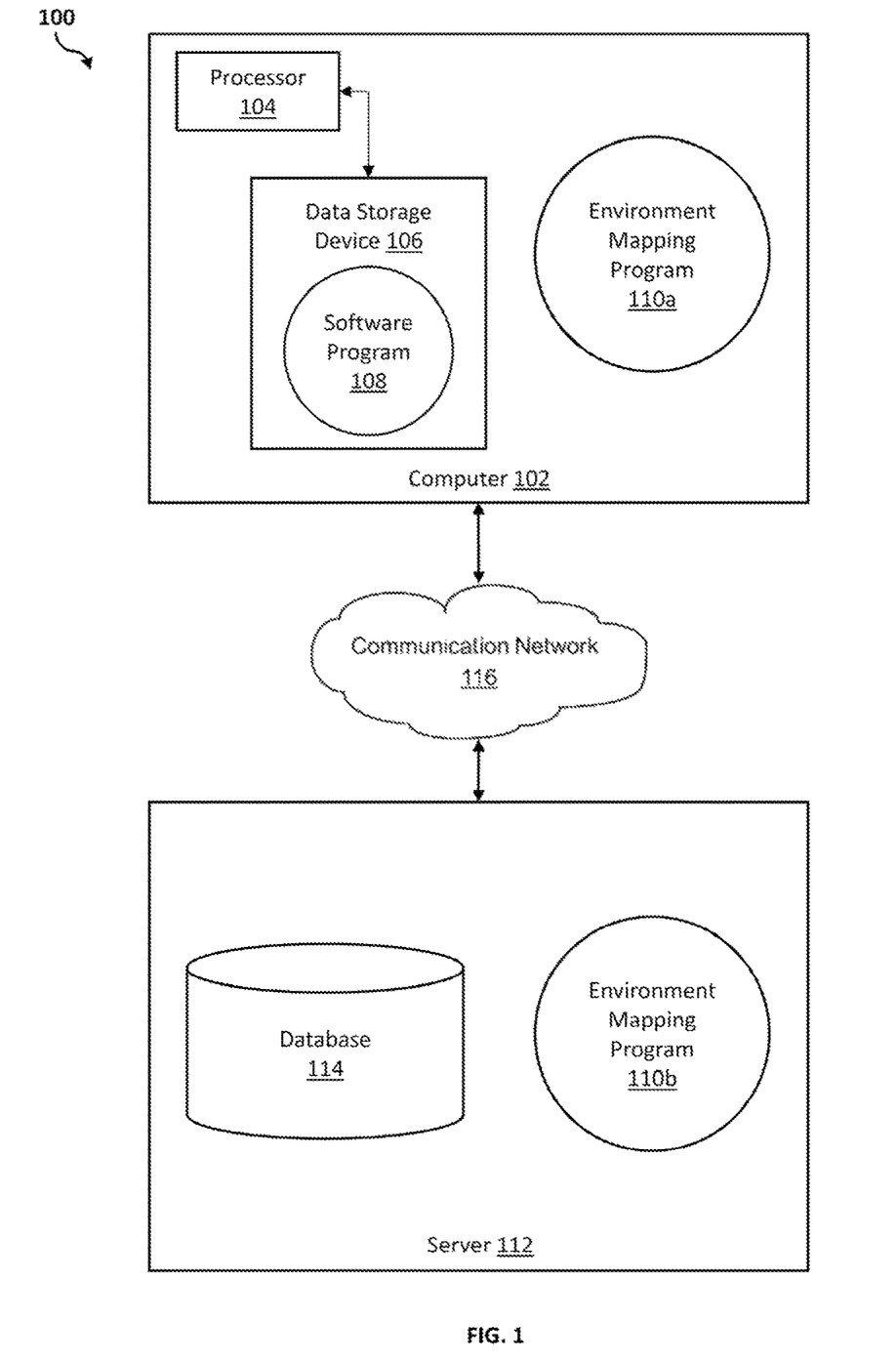
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an environmental mapping program 110a. The networked computer environment 100 may also include a server 112 that is enabled to run an environmental mapping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the environmental mapping program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the environmental mapping program 110a, 110b (respectively) to generate a digital twin, wherein the digital twin is a digital representation of a smart building. The environmental mapping method is explained in more detail below with respect to FIG. 2.

Figure 2:
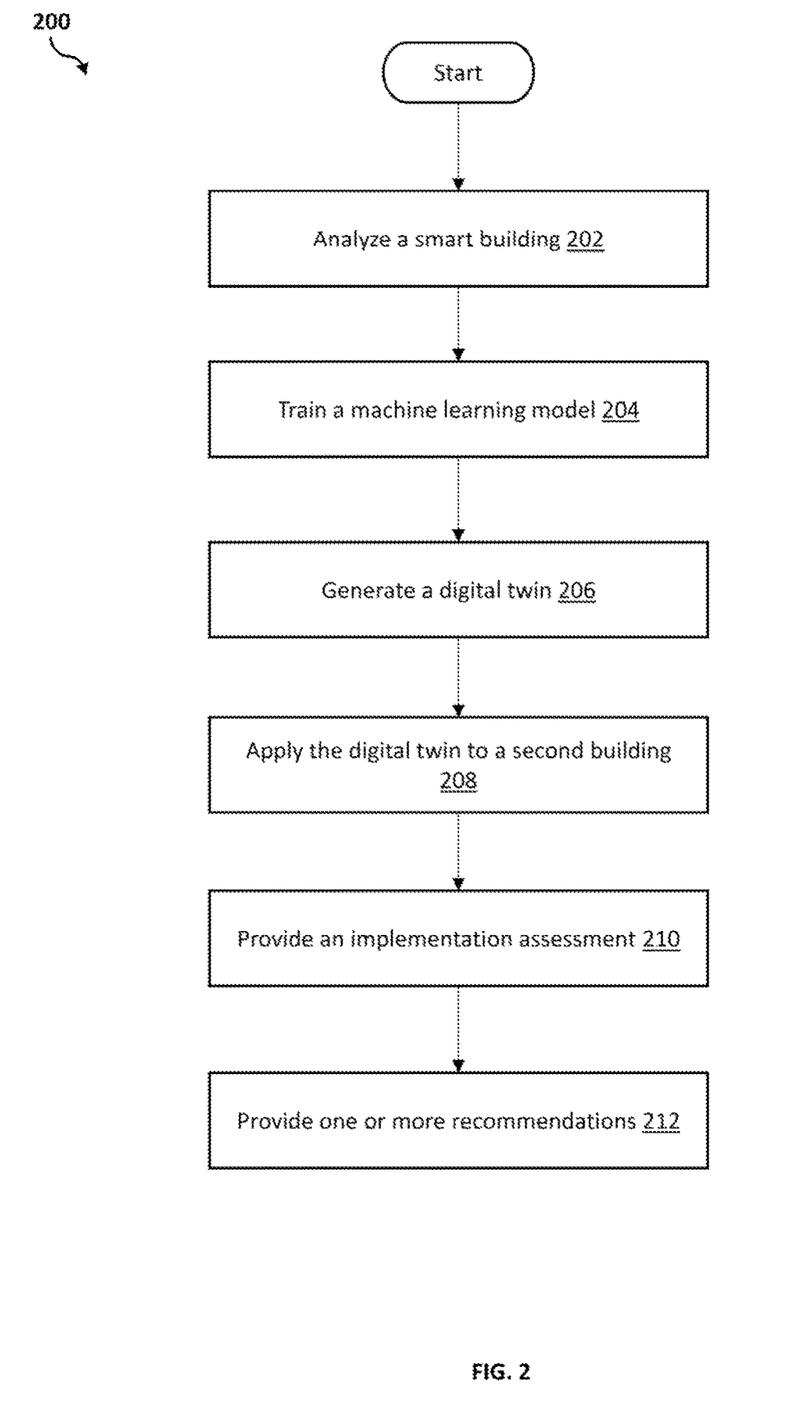
FIG. 2 is an operational flowchart illustrating a process for environment mapping according to at least one embodiment.

Referring now to FIG. 2, an operational flowchart illustrating the exemplary environmental mapping process 200 used by the environmental mapping program 110a and 110b (hereinafter environmental mapping program 110) according to at least one embodiment is depicted.

At 202, the environmental mapping program 110 analyzes a smart building. The smart building may be a structure such as, but not limited to, a house, school, store, office, or factory, among other structures, utilizing one or more IoT (Internet of Things) devices to control and monitor the environment of the smart building. IoT devices may control and monitor, but are not limited to controlling and monitoring, thermostats, lighting, air quality, smoke detectors, carbon monoxide detectors, irrigation systems, security, air conditioning, movement, and ventilation systems.

The one or more IoT devices may monitor the environment of the smart building by perform readings of the environment of the smart building. The one or more IoT devices may be connected to at least one sensor (e.g., temperature sensor, motion sensor, humidity sensor, pressure sensor, accelerometers, gas sensor, multi-purpose IoT sensor, among other sensors) to perform the reading. The IoT device may store data with respect to the reading on the IoT device. The IoT device may broadcast the data to a comprehensive database. The comprehensive database may be a shared ledger (e.g., distributed ledger, hyperledger). The comprehensive database may be accessible by a centralized device.

The one or more IoT devices may control the environment of the smart building based on the preferences of the user (e.g., user preferences). The preferences of the user may include, but are not limited to including, temperature, lighting, air quality, entertainment settings, amongst others. The preferences of the user may vary with respect to time of day, weather conditions, amongst others. The preferences of the user may be adjusted by the centralized device.

The environmental mapping program 110 may prompt a user for details based on the preferences of the user. The user may provide details on the preferences of the user utilizing the centralized device. For example, the user may have an allergy and require a certain humidity level.

The centralized device (e.g., computing device) may include, but is not limited to including, a personal digital assistant (PDA), cellular telephone, desktop computer, laptop computer, and/or automobile computer system.

The comprehensive database may be comprised of the data monitored by the one or more IoT devices, the settings of the one or more IoT devices, and the preferences of the user (e.g., user preferences).

The environmental mapping program 110 may utilize the comprehensive database in conjunction with building information to analyze the smart building. Building information may include, but are not limited to including, square footage, property size, location, material used in construction, window types, year built, blueprints, roofing details, architecture, information on appliances, amongst others.

The environmental mapping program 110 may gather the building information from publicly available resources. The environmental mapping program 110 may request building information from a user. The environmental mapping program 110 may request building information from the user by sending one or more questions to the user. The environmental mapping program 110 may send the one or more questions to the user on the centralized device.

The environmental mapping program 110 may utilize the comprehensive database in conjunction with the building information to determine a green score. The green score may provide the user an objective measure of the environmental impact of the preferences of the user in the smart building. The user may allow the green score to be accessed by third parties.

For example, the preferences of User 1 may be that smart building 1 remain at 70 degrees Fahrenheit. The preferences of User 2 may be that smart building 2 remain at 70 degrees Fahrenheit as well. However, their preferences with respect to lighting may differ as well as the building information for smart building 1 and smart building 2. Therefore, the environmental mapping program 110 may determine a different green score for User 1 and User 2 although their preferences with respect to temperature are the same. The green score may be able to be utilized by a user, for example, by informing a landlord or online rental marketplace select a more environmentally conscious user.

At 204, the environmental mapping program 110 trains a machine learning model. The environmental mapping program 110 may train the machine learning model based on the comprehensive database in conjunction with the building information. The environmental mapping program 110 may utilize the machine learning model to determine the green score. The environmental mapping program 110 may utilize the machine learning model in adjusting the green score. The environmental mapping program 110 may utilize the machine learning model in estimating changes in the green score.

The machine learning model may utilize a convolutional neural network (CNN). The machine learning model may utilize the CNN to perform a time series analysis. The machine learning model may utilize supervised learning models, such as, but not limited to support-vector machines, k-nearest neighbor algorithm, amongst others, for classification and regression of at least the comprehensive database and building information.

The machine learning model may utilize a decision tree learning predictive modelling approach. The decision tree learning predictive modelling approach may utilize at least the comprehensive database and the building information.

The environmental mapping program 110 may provide the machine learning model with other relevant data. Other relevant data, may include, but is not limited to including, price listings for energy efficient appliances, average installation costs for those energy efficient appliances, and average monthly savings after installing those energy efficient appliances. The environmental mapping program may determine other relevant data based on the building information.

The environmental mapping program 110 may provide one or more recommendations to the user based on at least the comprehensive database, building information, and other relevant data. The one or more recommendations may include estimates of cost, savings, and green score improvement.

The environmental mapping program 110 may receive feedback from the user based on changes made. For example, the user may provide the actual cost of installation and energy efficient appliances. The environmental mapping program 110 may utilize feedback from the user in training the machine learning model.

Continuing with the above example, the environmental mapping program 110 may determine User 1 has a green score of 300 and User 2 has a green score of 200 (in this example a higher green score represents a lower environmental impact for the smart building). The environmental mapping program 110 may provide User 2 with one or more recommendations. For example, new energy efficient windows would increase User 2's green score by an estimated 50 points, cost an estimated $2,000.00 and saver User 2 on estimated average of $50.00 a month on User 2's energy bill. User 2 could choose to replace smart building 2's windows with energy efficient windows and update the building information accordingly, as well as provide feedback such as, but not limited to, cost of installation, window type, actual cost, amongst others. The environmental mapping program 110 may utilize this feedback in training the machine learning program, allowing the environmental mapping program 110 to provide a user with more accurate recommendations for estimates of cost, savings, and green score improvement.

At 206, the environmental mapping program 110 generates a digital twin. The digital twin may be a digital representation of the smart building translatable to other buildings. For example, the environmental mapping program 110 may utilize three-dimensional (3D) mapping software to build a digital representation of the smart building. The digital representation may be a replica of the physical system of the smart building.

The digital twin may be based on the comprehensive database and building information of the smart building. The comprehensive database may be comprised of at least data received by the one or more IoT devices, the settings of the one or more IoT devices, and preferences of the user.

The digital twin may be updated based on changes to the comprehensive database, building information, and preferences of the user. The digital twin may be stored in a cloud database. The digital twin may be accessed by the user on the centralized device. The environmental mapping program 110 may utilize the digital twin as well as the data comprising the digital twin to analyze other buildings and provide recommendations to other users.

At 208, the environmental mapping program 110 applies the digital twin to a second building. The second building may be selected by the user. The environmental mapping program may utilize 3D mapping software to build a digital representation of the second building.

The environmental mapping program 110 may utilize the digital representation of the second building to apply the digital twin by determining corresponding IoT devices and corresponding building information between the smart building and the second building.

The environmental mapping program 110 may prompt the user as to whether to implement the digital twin. The user may receive the prompt using the centralized device.

Continuing with the above example in which User 1 has a green score of 300. User 1 may be in the market for a second home, User 1 may select a home using a realty website in which to apply User 1's digital twin of smart building 1. The environmental mapping program 110 will apply the digital twin and to the second building and utilizing the preferences of User 1 estimate at least monthly costs, a green score, as well as a list of recommendation on how to improve the green score. The monthly costs and green score may be based on the implementation of the preferences of User 1 in the second building. User 1 may be able to accurately assess the cost of the user preferences in the second building.

Another example may involve User 2 checking into a hotel room. User 2 may receive a prompt on whether to implement the digital twin for smart building 2 into the hotel room, the prompt may inform User 2 of the green score before implementing the digital twin. The environmental mapping program 110 may implement the digital twin and utilizing corresponding IoT devices the preferences of User 2 may be implemented in the hotel room. These user preferences may include a temperature of 70 degrees Fahrenheit, as well as adjusting the lighting, and adjusting entertainment settings.

At 210, the environmental mapping program 110 provides an implementation assessment. The implementation assessment may include, but is not limited to including, an estimated green score of the preferences of the user applied in the second building, an estimated cost of the preferences of the user in the second building, details of the environmental impact of the preferences of the user in the second building. The green score of the second building may provide the user an objective measure of the environmental impact of the preferences of the user in the second building.

The user may receive a prompt to the centralized device with respect to the secondary building. The prompt may allow the environmental mapping program 110 provide a more detailed implementation assessment. For example, the environmental mapping program may provide a different implementation assessment for a temporary hotel room versus a potential second home.

The implementation assessment may estimate the cost and environmental impact of the preferences of the user in the second building. The implementation assessment may illustrate a comparison of the green score for the smart building and the second building. The implementation assessment may detail the preferences of the user that are determined to have the largest impact on the green score of the second building.

The environmental mapping program 110 may allow for the user to select a desired green score for the second building. The environmental mapping program 110 may evaluate the preferences of the user in conjunction with the desired green score of the second building and adjust the preferences of the user as to meet the desired green score. The environmental mapping program may evaluate details on the preferences of the user prior to adjusting the preferences of the user to meet the desired green score. For example, if the preferences of the user reflect a certain humidity level and the user has allergies requiring a certain humidity level to be maintained the environmental mapping program will adjust the preferences of the user in a manner in which the certain humidity level is maintained.

At 212, the environmental mapping program 110 provides one or more recommendations. The one or more recommendations may depend on the user's response to the prompt received by the user on the centralized device.

If the user's purpose is short term, the environmental mapping program 110 may provide one or more recommendations the user can implement immediately, such as, but not limited to, temperature and lighting adjustments. The environmental mapping program 110 may provide corresponding green score improvements with the one or more recommendations.

For example, if the user is staying in a hotel room in a tropical location, the environmental mapping program 110 may recommend a temperature range about that of the preferences of the user. The environmental mapping program 110 may provide the user one or more recommended temperature ranges and the corresponding green score improvement for each temperature range allowing the user to determine the impact of a given selection.

If the user's purpose is long term, the environmental mapping program 110 may provide one or more recommendations the user can implement over a period of time, such as, but not limited to, energy efficient utilities, solar panels, insulation, the addition of one or more IoT devices. The environmental program 110 may provide corresponding green score improvements with the one or more recommendations, as well as estimated cost and estimated savings over time.

For example, User 1 has a green score of 300 in smart building 1, the environmental mapping program 110 may provide an estimated cost to User 1 of achieving a green score of 300 in the second building.

The environmental mapping program 110 may receive feedback from the user based on the one or more provided recommendations. For example, the user may provide the actual cost of installation and savings for a recommended energy efficient appliance. The environmental mapping program 110 may utilize feedback from the user in training the machine learning model.

The environmental mapping program 110 may adjust the preferences of the user based on feedback received from the user. For example, the user may determine a range of temperatures as opposed to a stringent exact temperature is immaterial to the user's comfort or the green score impact is more important.

The environmental mapping program 110 may receive feedback from the user with respect to adjustments made to reach the desired green score for the second building. The environmental mapping program 110 may train the machine learning model based on the feedback received from the user. The machine learning model may learn which preferences of the user are preferred by the user in comparison to others. For example, in order to achieve the desired green score, the environmental mapping program 110 adjusted the lighting to be dimmer than the preferences of the user, the temperature to be below the preferences of the user and adjusted the temperatures of the refrigerator. The user may provide negative feedback with respect to the lighting. The machine learning model may utilize this user feedback to place a limit on the adjustment of lighting.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
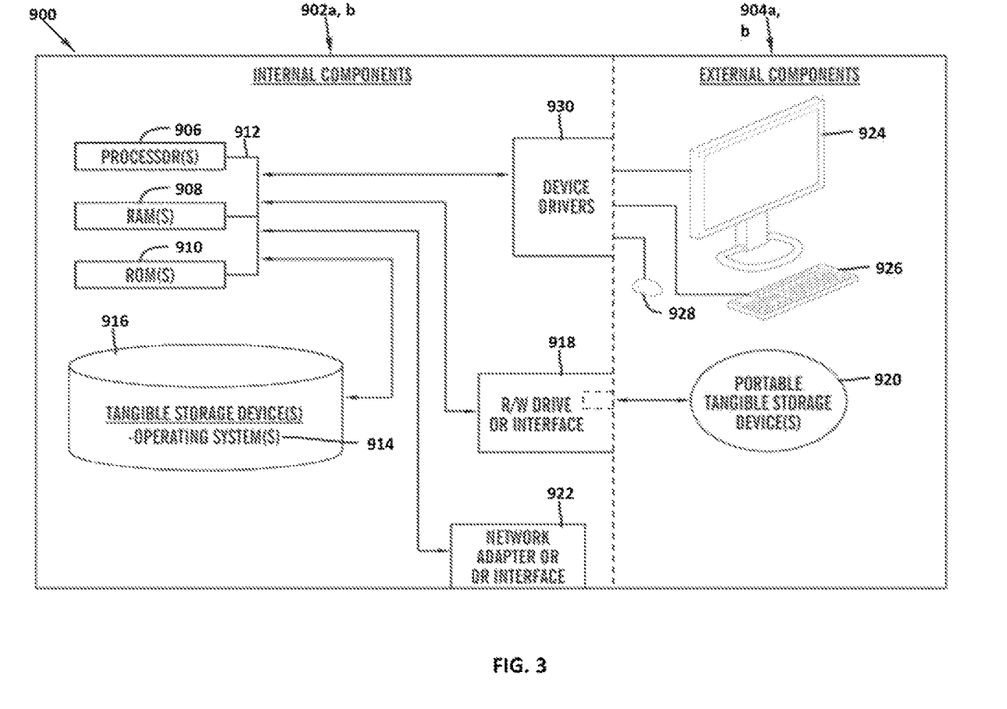
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the environmental mapping program 110a in client computer 102, and the environmental mapping program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the environmental mapping program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the environmental mapping program 110a in client computer 102 and the environmental mapping program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the environmental mapping program 110a in client computer 102 and the environmental mapping program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
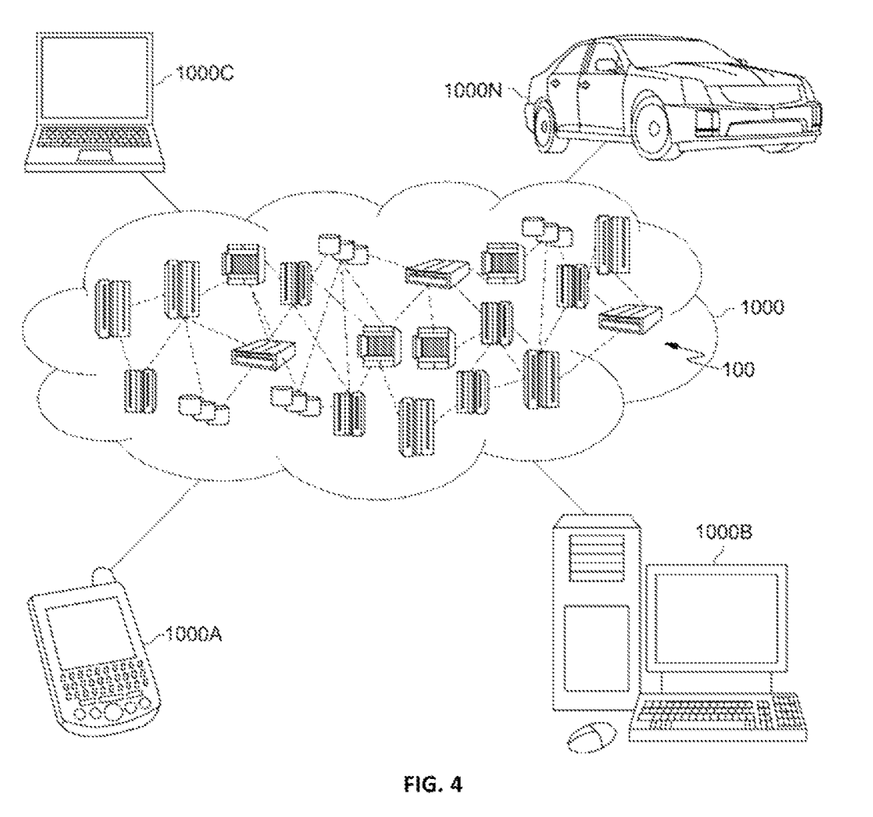
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
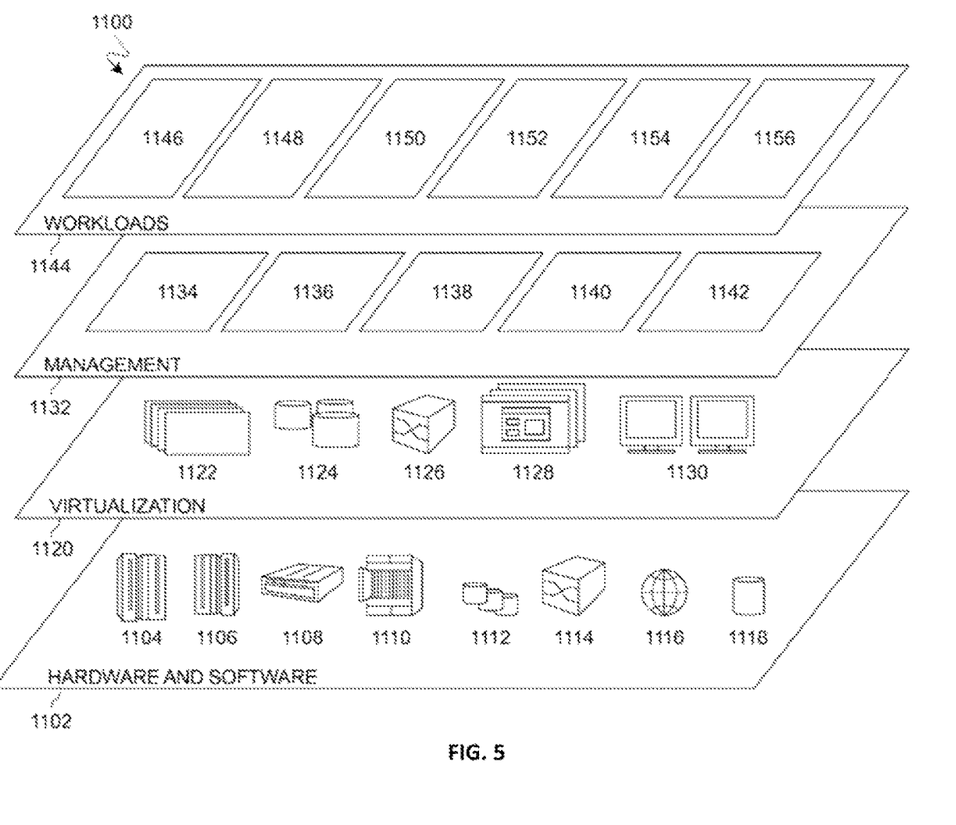
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and environmental mapping 1156. An environmental mapping program 110a, 110b provides a way to analyze a smart building and generate a digital twin, wherein the digital twin may be applied to a second building.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for environment mapping, the method comprising:
   generating a digital twin, wherein the digital twin is a digital representation of a smart building as a first structure, wherein preferences of a user are associated with the smart building, a machine learning model being trained based on information associated with the smart building, the preferences being specific to the user versus other users, the preferences relating to a satisfaction for the user;
   applying the digital twin to a second building as a second structure different from the first structure;
   providing an implementation assessment that comprises estimating a green score for the second building based on the preferences associated with the smart building, wherein the implementation assessment includes at least the environmental impact of the preferences of the user in the second building; and
   in response to applying the preferences to the second building as the second structure and in response to receiving user feedback from the user for the preferences applied to the second building as the second structure, further training the machine learning model based on the user feedback associated with an adjustment to the second building to improve the green score, the adjustment being a modification to the preferences of the smart building as the first structure.

2. The method of claim 1, further comprising:
providing one or more recommendations.

3. The method of claim 1, wherein applying the digital twin to the second building further comprises:
determining one or more corresponding IoT devices; and
determining corresponding building information between the smart building and the second building.

4. The method of claim 1, wherein the second building is selected by the user.

5. The method of claim 2, wherein providing the one or more recommendations further comprises:
receiving the user feedback; and
training the machine learning model based on the user feedback.

6. The method of claim 2, wherein providing the one or more recommendations is based on a response by the user to a prompt received by the user on a centralized device.

7. A computer system for environment mapping, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
generating a digital twin, wherein the digital twin is a digital representation of a smart building as a first structure, wherein preferences of a user are associated with the smart building, a machine learning model being trained based on information associated with the smart building, the preferences being specific to the user versus other users, the preferences relating to a satisfaction for the user;
applying the digital twin to a second building as a second structure different from the first structure;
providing an implementation assessment that comprises estimating a green score for the second building based on the preferences associated with the smart building, wherein the implementation assessment includes at least the environmental impact of the preferences of the user in the second building; and
in response to applying the preferences to the second building as the second structure and in response to receiving user feedback from the user for the preferences applied to the second building as the second structure, further training the machine learning model based on the user feedback associated with an adjustment to the second building to improve the green score, the adjustment being a modification to the preferences of the smart building as the first structure.

8. The computer system of claim 7, further comprising:
providing one or more recommendations.

9. The computer system of claim 7, wherein applying the digital twin to the second building further comprises:
determining one or more corresponding IoT devices; and
determining corresponding building information between the smart building and the second building.

10. The computer system of claim 7, wherein the second building is selected by the user.

11. The computer system of claim 8, wherein providing the one or more recommendations further comprises:
receiving the user feedback; and
training the machine learning model based on the user feedback.

12. The computer system of claim 8, wherein providing the one or more recommendations is based on a response by the user to a prompt received by the user on a centralized device.

13. A computer program product for environment mapping, comprising:
one or more non-transitory computer-readable storage media and program instructions stored on at least one of the one or more tangible storage media, the program instructions executable by a processor to cause the processor to perform a method comprising:
generating a digital twin, wherein the digital twin is a digital representation of a smart building as a first structure, wherein preferences of a user are associated with the smart building, a machine learning model being trained based on information associated with the smart building, the preferences being specific to the user versus other users, the preferences relating to a satisfaction for the user;
applying the digital twin to a second building as a second structure different from the first structure;
providing an implementation assessment that comprises estimating a green score for the second building based on the preferences associated with the smart building, wherein the implementation assessment includes at least the environmental impact of the preferences of the user in the second building; and
in response to applying the preferences to the second building as the second structure and in response to receiving user feedback from the user for the preferences applied to the second building as the second structure, further training the machine learning model based on the user feedback associated with an adjustment to the second building to improve the green score, the adjustment being a modification to the preferences of the smart building as the first structure.

14. The computer program product of claim 13, further comprising:
providing one or more recommendations.

15. The computer program product of claim 13, wherein applying the digital twin to the second building further comprises:
determining one or more corresponding IoT devices; and
determining corresponding building information between the smart building and the second building.

16. The computer program product of claim 14, wherein providing the one or more recommendations is based on a response by the user to a prompt received by the user on a centralized device.

17. The method of claim 1, further comprising:
adjusting the preferences of the user to accommodate a health condition of the user.

18. The method of claim 1, further comprising:
in response to a selection of a desired green score, adjusting the preferences of the user to meet the desired green score for the second building.

19. The method of claim 1, wherein the machine learning model comprises at least one of a neural network, a support-vector machine, or a k-nearest neighbor algorithm.

* * * * *